March 31, 1970 J. E. ORR ETAL 3,504,223

HIGH POWER WIDE BAND CROSS FIELD AMPLIFIER
WITH CERAMIC SUPPORTED HELIX

Filed Sept. 7, 1967 2 Sheets-Sheet 1

INVENTORS
JAMES E. ORR
CARL LAWRENCE JONES
NELSON KEITH BICKFORD
By Ronald M. Goldman
ATTORNEY INVENTORS:
JAMES E. ORR
CARL LAWRENCE JONES
NELSON KEITH BICKFORD
By Ronald M. Goldman
ATTORNEY 3,504,223

HIGH POWER WIDE BAND CROSS FIELD AMPLIFIER WITH CERAMIC SUPPORTED HELIX

James E. Orr, Atherton, Carl Lawrence Jones, Santa Clara, and Nelson Keith Bickford, Los Altos, Calif., assignors to Litton Precision Products, Inc., San Carlos, Calif., a corporation of Delaware Filed Sept. 7, 1967, Ser. No. 666,009
Int. Cl. H01j 25/34
U.S. Cl. 315—3.5 4 Claims

ABSTRACT OF THE DISCLOSURE

A crossed field amplifier is provided in which the slow wave structure contains a helix supported by an elongated ceramic body that extends through the helix center. A hollow passage extends through the ceramic body and permits coolant to be circulated therethrough to permit heat created in the turns of the helix to be efficiently conducted through the ceramic support body and dissipated in the coolant. In addition, the portions of the turns which face the sole electrode are separated from the ceramic support by a small clearance in order to avoid the consequences of sputtering. Additionally, the helix is formed directly on the ceramic support by a novel method which includes masking, electroforming, milling and etching.

Figure 1:
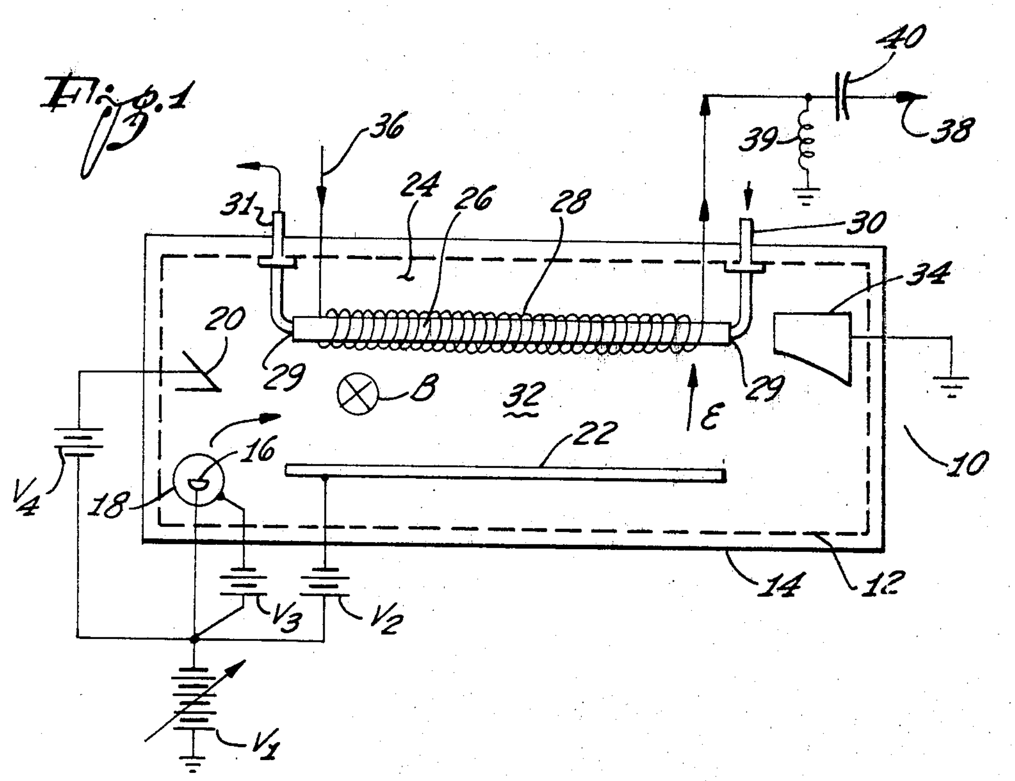

This invention relates to a method and apparatus in a crossed field amplifier and, more particularly, to a crossed field amplifier having a slow wave structure which permits improved heat transfer, and a method for constructing the slow wave structure.

As is known, the cross field amplifier is a microwave device which amplifies signals at high microwave frequencies. Conventionally, an interaction region is defined between a slow wave structure and a sole electrode. An electric field is established between the sole electrode and the slow wave structure and a magnetic field is applied across the interaction region perpendicular to the direction of the electric field to establish a crossed field within the interaction region. A source of electrons located at one end of the interaction region provides electrons which are directed into the interaction region in a direction perpendicular to both the electric and magnetic fields and a collector electrode is located at the other end of the interaction region to collect any electrons which have passed through the interaction region.

In such a device a signal typically in the microwave frequency range would be amplified is applied at an input to one end of the slow wave structure. This signal propagates along the slow wave structure to the other end where it is connected to an output terminal. Within the slow wave structure fundamental frequencies or spacial harmonics designed to be one of the frequencies to be amplified having a predetermined phase velocity are created and according to well known electromagnetic theory the stream of electrons directed into the interaction region at a velocity approximately equal to that phase velocity interacts with the electromagnetic energy to transfer energy thereto.

Initially, the electrons entering the interaction region must do so at the designed velocity determined by the ratio of $E$ to $B$. Electrons faster or slower are initially sorted out by the well understood deflection principles for electrons traveling slower or faster than the ratio $E/B$. Since the electron travels close to the slow wave structure at a predetermined velocity, $E/B$, it interacts with the particular fundamental frequency or space harmonic on the slow wave structure having a phase velocity of approximately the same value. A worthwhile explanation of this phenomenon appears in U.S. Patent No. 3,325,677, granted to J. E. Orr.

In so interacting, the electron is slowed down slightly and accordingly falls closer to the slow wave structure. However, because of the magnetic field, any such particular electron is brought up to the correct velocity and continues interacting with the particular spacial harmonic or fundamental wave. The electron in falling closer to the slow wave structure, however, undergoes a loss of potential energy. Ideally, this interaction continues for this and other electrons until they either lose all potential energy and fall into the slow wave structure or are collected at the end of the interaction region. Thus, signals of the proper phase velocity applied to the input of the crossed field amplifier are amplified and appear as amplified signals at the output end of the slow wave structure.

In the past the slow wave structure of conventional crossed field amplifiers has taken many forms. Conventional examples are the interdigital slow wave structure, the ladder structure, the split folded slow wave structure, and the helix. Each of these slow wave structures possess distinguishable dispersion characteristics: That is, they exhibit diverse types of frequency dependent gain characteristics. Where it has been desired to provide a crossed field amplifier capable of amplifying signals over a very large bandwidth of possible input frequencies of over an octave or more, the helix or helical slow wave structure has universally been chosen. Alternatively, for operation in a narrow band of frequencies in order to obtain higher output powers at a single frequency slow wave circuits other than the helix have been used.

In the past one attempted construction of wide bandwidth crossed field amplifier a flattened or squashed helix is used as the slow wave structure. Unfortunately, the only convenient manner of supporting the helix to the envelope housing the crossed field amplifier was to braze a ceramic strip between the envelope or housing of the amplifier and on the outer periphery of a portion of the turns of the helix on the side of the helix farthest from the interaction region. Coolant was circulated past this ceramic support.

In such an amplifier, a source of electrons is formed into a strip beam which is focused adjacent to the flat or wide side of the helix in the interaction region defined between the sole electrode and the helix. Two of the undesirable conditions inherent in the operation of the crossed field amplifier are apparent: As electrons pass through the interaction region they transfer their potential energy to the electromagnetic wave in the helix. The electrons fall through the electric field E closer to the slow wave structure; consequently, inasmuch as a certain percentage of the electrons lose all their potential energy, they collide with the slow wave structure; and consequently, the turns of the helix. Although the electrons have lost their potential energy, they still possess a large kinetic which, as the electron collides with the slow wave structure, is dissipated in the form of heat.

Normally, the electrons do not lose all their potential energy until they reach the end of the interaction region most remote from the electron source and approximate the collector electrode; and consequently, the portion of the slow wave structure nearest the collector electrode is heated to very high temperatures. Thus, in the ceramic supported squashed helix referred to, the turns of the helix were quickly heated. Since the ceramic support only supported the helix from the outer periphery of each turn, heat transfer from the portions of the helix closest to the sole electrode to and through the ceramic support to the coolant was very poor. Because of this heating, present width bandwidth crossed field amplifiers have been limited in operation to between 500 and 1000 watts.

A second phenomenon associated with the operation of the crossed field amplifiers is the occurance of "sputtering." Some electrons manage to collide with the residual gas molecules producing ions which are attracted to the sole electrode and cause a neutral atom or an ion of the sole electrode metal to drift toward the slow wave structure. In those slow wave structures containing a helix supported along one side by a slab of ceramic material, such atoms or ions are deposited on the ceramic material between the turns of the helix. The deposition of the atoms of conductive material on the ceramic thus shortcircuited individual turns of the helix.

Therefore, it is an object of the invention to provide a crossed field amplifier having a high power output;

It is a further object of the invention to provide a crossed field amplifier having both a high power output and a wide bandwidth characteristic;

It is a still further object of the invention to provide a crossed field amplifier that is relatively unaffected by sputtering;

And, it is an additional object of the invention to provide increased cooling of the slow wave structure of a crossed field amplifier.

Briefly stated, the invention encompasses an improved crossed field amplifier containing a sole electrode separated from a slow wave structure to define an interaction region therebetween, a crossed electric and magnetic field is established within such interaction region, and a source of electrons is provided to accelerate electrons into the interaction region where the electrons interact with microwave energy coupled to the slow wave structure. The slow wave structure includes an elongated ceramic body which is fitted within the turns of a conductive helix along the length thereof to support the helix. In accordance with another aspect of the invention, a hollow passage extends through the ceramic body and a source of coolant is connected to this passage for circulating coolant therethrough.

Further in accordance with an additional aspect of the invention, at least a portion of each turn in the helix facing the sole electrode is separated from the ceramic body by a small gap or clearance to eliminate the consequences of sputtering.

Additionally, the invention encompasses a method for constructing a slow wave structure in which strips of copper are formed around the face of a rectangular ceramic body by electroforming, milling and etching.

Figure 2:
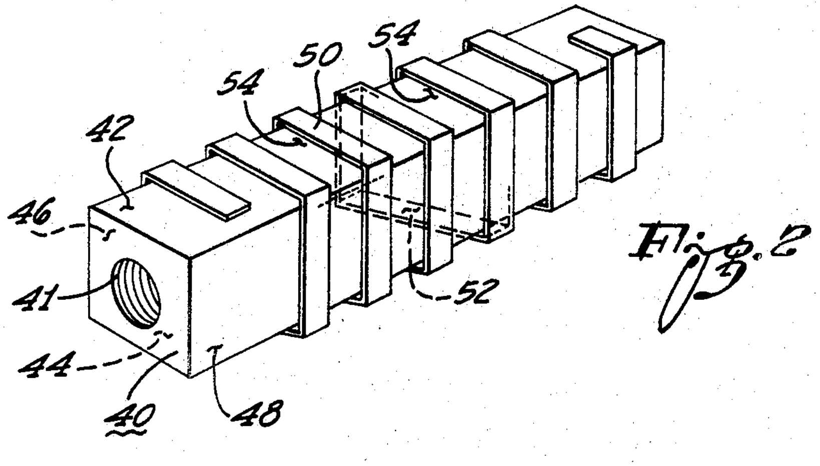
Figure 3:
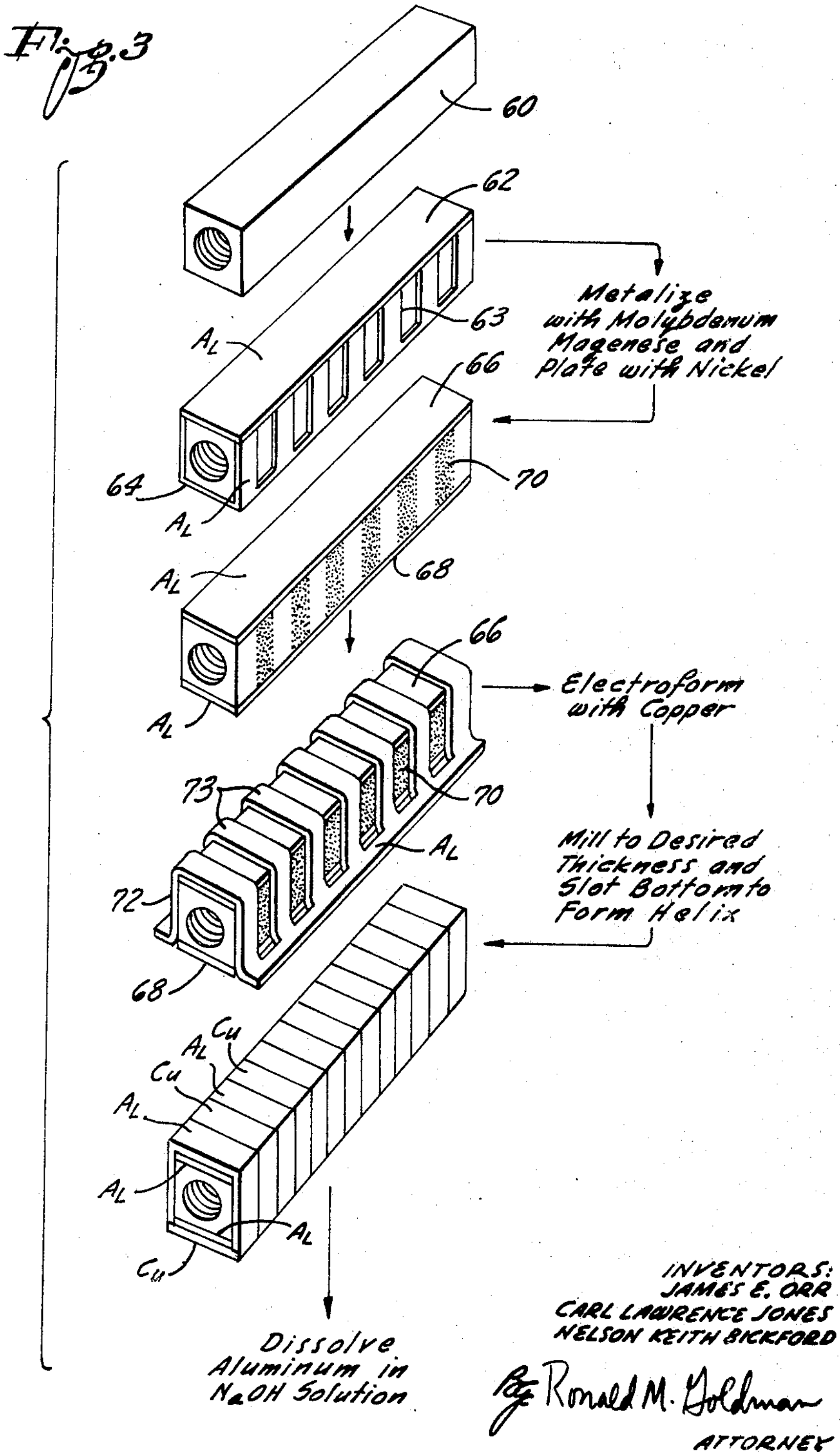

The foregoing other objects and advantages of the invention, together with its arrangement and form is better understood by a consideration of the following detailed specification taken together with the figures of the drawing in which:

FIGURE 1 schematically illustrates a crossed field amplifier embodying the invention;

FIGURE 2 shows a specific embodiment of a slow wave structure used in the crossed field amplifier of FIGURE 1; and FIGURE 3 illustrates one particular method of forming a slow wave structure embodying the invention.

In FIGURE 1 amplifier 10 is schematically illustrated and includes a suitable vacuum envelope represented schematically by dashed lines 12 and magnetic pole pieces 14 for establishing a magnetic field of intensity B within vacuum envelope 12. Magnetic field B is represented by the encircled X in FIGURE 1. An electron gun consisting of a cathode 16, a grid 18, and accelerator electrode 20 is positioned at one end of amplifier 10. A sole electrode 22 is supported within the amplifier and generally possesses the geometry of a flat strip. Spaced from sole electrode 22 is a slow wave structure 24.

Slow wave structure 24 includes a hollow elongated ceramic body or support 26 which, preferably, is rectangular in shape. The hollow forms a passage through the ceramic support. A helix 28 is wound along the ceramic body 26 from one end to the other. The diameter spacing of the turns of conductive helix 28 and the number of turns in the helix is determined by well known design considerations and is a function of the input frequency to be amplified. A pair of hollow tubes 29, suitably Monel, are brazed into place at each end of the passage through ceramic support 26 and extends outside the vacuum envelope 12. Tubes 29 are vacuum sealed both to the ends of the hollow passage of ceramic body 26 and to the amplifier envelope 12 so as not to destroy the integrity of the vacuum.

In this embodiment of the invention, Monel tubes 29 additionally function to support ceramic body 26 to the desired location within envelope 12. Through conventional couplings, not illustrated, one end of tube 29 has an input end 30 that is connected to receive the output of a conventional source of fluid coolant. The Monel tube 29 nearest the electron gun is coupled at an end or output 31 to the source of coolant to return the coolant which passes through the hollow passage within ceramic support 26 and support tubes 29.

As is conventional, the space between slow wave structure 24 and sole electrode 22 defines an interaction region 32 in which the electron beam from the electron source or gun, as variously termed, interacts with an electromagnetic wave appearing on slow wave structure 24.

The crossed field amplifier contains a conventional collector electrode 34 located at the end of the interaction region 32 farthest from the electron gun and more proximate slow wave structure 24 than sole electrode 22. An input 36 provides coupling for electromagnetic energy to slow wave structure 24 and an output 38 provides for removal of electromagnetic energy from slow wave structure 24 through a high pass filter consisting of capacitor 39 and inductor 40. As illustrated in FIGURE 1, slow wave structure 24 and collector electrode 34 are maintained at ground potential. Slow wave structure 24 is connected to ground potential through inductor 39. Inductor 39 prevents the RF signals from being shunted to ground. A variable voltage source $V_1$ applies a relatively large negative voltage to cathode 16. Voltage source $V_2$ provides a negative voltage, relative to cathode 16, to sole electrode 22; voltage source $V_3$ applies a negative voltage, relative to cathode 16, to grid 18; and voltage source $V_4$ applies a positive voltage, relative to cathode 16, to accelerator electrode 20.

The details of construction of the crossed field amplifier are well known and understood by those skilled in the art; hence, any further discussion of those conventional considerations is not added to the present specification. While FIGURE 1 illustrates the arangement of one embodiment of the invention in a linear device, the invention and the elements necessary thereto are equally applicable and equivalent to crossed field amplifiers which are circular in their geometry.

The operation of the crossed field amplifier is well known and aptly described in the literature. Briefly, an electric field is established between sole electrode 22 and slow wave structure 24 represented by E in FIGURE 1, and a magnetic field B is established in a direction perpendicular to the electric field represented by B in FIGURE 1. These are created by the source of voltages V1 and V2 and magnetic circuit including pole pieces 14, respectively.

A signal of electromagnetic energy to be amplified is supplied at input 36. This signal propagates along and into slow wave structure 24 to output terminal 38.

The cathode 16 emits electrons which are deflected and accelerated by accelerator electrode 20 into interaction region 32 between slow wave structure 24 and sole electrode 22. Through the design of accelerator 20 and the accelerator voltage, the electrons are generally traveling into interaction region 32 at a velocity of $E/B$. These electrons interact with and by falling closer to the slow wave structure transfer their potential energy to the electromagnetic wave having a phase velocity VP of a magnitude approximately equal to that of the velocity of the electrons. Under these conditions there is a transfer of energy from the simple electron beam to the electromagnetic wave.

Consequently, the electromagnetic wave applied to input 36 appears at the output 38 as an amplified signal. When energy is taken for the electrons, they lose some potential energy. Those electrons which lose all potential energy for completely transferring such potential to the electromagnetic wave prior to leaving interaction region 32 fall into slow wave structure 24 near the collector electrode end, whereas other electrons that have not completely transferred their potential energy continue out of interaction region 32 and are incident upon collector electrode 34.

As is apparent, since the operation of the crossed field amplifier requires that the electrons be traveling at a velocity of $E/B$ throughout interaction region 32 even though those electrons are losing their potential energy in falling away from sole electrode 22 and toward slow wave structure 24 through the drop in electrical potential therebetween.

The traveling electron contains a great deal of kinetic energy which is dissipated in the form of heat when it strikes portions of the slow wave structure 24. Coolant from a conventional source, not illustrated, is supplied to tube 29 at the input 30 located nearest the collector end of interaction region 32. This coolant travels into tube 29 and through the hollow passage within ceramic support 26. Thence, the coolant travels out the copper tube 29 located nearest the electron gun and out through output 31 to return to the coolant source.

Since the turns of the conductive helix 28 are in contact with the ceramic body 26, which, as noted, may consist of beryllia or alumina, the heat generated in the helix by the colliding electrons is intimately transferred from the turns of helix 28 through the ceramic body 26 to the coolant fluid within the hollow passage. Since this heat transfer occurs over a great portion of each turn in the helix, there is a substantial increase in the heat transfer possible with the invention than with constructions heretofore available. Whereas previous cross field amplifiers of this type are limited to between 500 and 1000 watts, with this invention the power capability is raised to 2 kilowatts or more.

FIGURE 2 illustrates a preferred construction of the center ceramic supported helix structure and shows a hollow elongated rectangular body 40 constructed of a dielectric ceramic material such as alumina or beryllia.

Ceramic 40 contains a hollow passage 41 which extends through the length of the body and contains four elongated flat surfaces which include the top surface 42, bottom surface 44, and side surfaces 46 and 48. A helix of conductive metal 50 contains individual turns which are wound about ceramic support 40 over a predetermined portion of the length thereof. Helix 50 consists of a predetermined number of turns of a conductive material in the form of a thin flat ribbon or strip. The turns of the helix are joined in series by a portion such as that indicated by the dashed lines 52 located on the bottom side 44. To avoid complicating the figure, only one such turn 52 connecting two adjacent turns of the helix is illustrated. However, similarly, the adjacent turns of other turns in the helix are joined together by a like structure.

Those portions of each turn of helix 50 which extend along sides 46 and 48 of the ceramic support, tightly abut those sides either frictionally or as is preferable are brazed thereto. The remaining portions of each turn in helix 50 is separated from the top and bottom sides 42 and 44 by a slight gap 54 illustrated in FIGURE 2. Thus, approximately half of each turn is in intimate contact with ceramic support 40.

The Monel tubes 29 illustrated in FIGURE 1 are brazed to ceramic support 40 at the entrance to passage 41 and at the exit, the latter of which is not visible in this figure.

It is noted that if each gap or clearance 54 in the helix construction of FIGURE 2 were eliminated and those portions of the helix were made to directly contact sides 42 and 44, a superior heat transfer could be obtained. However in the invention, such clearances are found to provide a shadowing effect which eliminates the undesirable consequences of "sputtering." If any conductive material is deposited on the face 42 of ceramic support 40, such conductive material may bridge individual turns of the helix 50, and consequently, shortcircuits them. The illustrated helix of FIGURE 2 contains an exaggerated fewer number of turns for purposes of illustration. However, as is known, the helix normally consists of a larger number of more closely spaced turns. Thus, in the normal helix because of the smaller spacing between turns such shortcircuit is more likely to occur. This destroys the characteristics of the helix arrangement and results in an inoperative amplifier.

The ceramic supported helix of FIGURE 2 is mounted in the amplifier of FIGURE 1 with face or side 42 facing sole electrode 22. In the operation of crossed field amplifiers, such as amplifier 10, an occasional gas ion may be accelerated and collide with sole electrode 22 with such force as to knock-out a neutral atom or ion of conductive material. Such an atom or ion drifts to various places within amplifier envelope 12. More prominently, because of the more positive electrical voltage on the slow wave structure, such an atom or ion travels across the interaction region over to the slow wave structure where it deposits usually at the lowest temperature location. This phenomenon is known as sputtering.

In the case of a helix, as illustrated in FIGURE 1, such an atom or ion deposits on the ceramic support 26. Consequently, if the turns of helix 50 in FIGURE 2 which are proximate face 42, contact face 42 an electrical shortcircuit could develop. However, inasmuch as the portions of helix 50 adjacent face 42 have a slight clearance 54, such ions may safely deposit upon face 42 without directly shortcircuiting individual turns of the helix. Thus, the clearance creates a shadowing effect which eliminates the consequences of sole electrode sputtering.

While the helix schematically illustrated in FIGURE 1 and FIGURE 2 may be constructed in various ways and various shapes, such as by simply winding a wire in the form of a helix and slipping it over the ceramic, or by taking segmented coiled portions and joining them together to form the helix, the method disclosed in FIGURE 3 is preferred. The elongated hollow ceramic support 60, which is constructed of a well known dielectric ceramic material such as alumina or beryllia, is fitted with a rectangular surface 62 of aluminum and a U-shaped member 64 which has arms having a comb-like structure. This forms a mask leaving only the teeth-like slots 63 in the comb 64 exposed. The sides are then sprayed with molybdenum manganese or an equivalent metallizing compound.

The mask, channel member 64, and surface 62, is then removed and the metalizing is fired into the ceramic body. The metalizing is then nickel plated leaving the metalized nickel plated strips 70 on the front and back or opposed sides of the ceramic body.

The metalized sides are then covered with a first 66 and second 68 rectangular covering of a filler material, suitably aluminum. Next, a mandrel 72 of filler material, suitably aluminum, is fitted over the top and sides of the ceramic body. This mandrel consists of a plurality of spaced strips 73 which extend around the elongated back side across the top and down the front side of the ceramic body leaving exposed only teeth-like portions of the aluminum covering 66 on the top side and metalized portions 70 on each of the front and back sides. Next, the entire structure is electroformed with copper. That is, copper is deposited on the mandrel 72 of the individual strips 73 and in the openings between strips 73 and covers the entire bottom aluminum sheet 68. After electroforming, the body is milled back into a rectangular shape of the desired thickness. This provides alternate teeth or strips of aluminum and copper across the top, and rear sides of the ceramic body. The bottom, however, is covered by two sheets, one by aluminum which is covered over by a layer of copper. The bottom side is then slotted at an angle so as to form a connection of copper between adjacent copper strips on the front and back sides and this connection is spaced from an adjacent one by the width of a slot. This forms the bottom turns of the helix, such as is illustrated by 52 in FIGURE 2. Following this step, the aluminum is dissolved in a sodium hydroxide solution.

As is apparent, the aluminum strips alternating between the copper strips are dissolved. In addtion, the aluminum layers previously referred to, 66 and 68, are dissolved leaving a clearance between the upper portion of the copper strip proximate the top side of the ceramic support with a slight clearance. This same clearance is formed between the bottom side of the ceramic body and the turns of the helix proximate thereto. This procedure produces a helix constructed as illustrated in FIGURE 2.

While the invention is thus disclosed in a particular embodiment and particular exemplary dimensions and values are given to enable one skilled in the art to make and use the invention, it is expressely understood that the invention is not limited to the specific details and illustrations. As is apparent, many modifications which lie within the spirit and scope of the invention suggest themselves to those skilled in the art.

Accordingly, it is intended that the invention be broadly construed and limited in scope only by the appended claims.

What is claimed is:

1. In a microwave cross field amplifier of the M-type having a source of electrons, a sole electrode, a slow wave structure spaced from said sole electrode to define an interaction region therebetween; means for establishing an electric field between said sole electrode and said slow wave structure, wherein said electric field undesirably promotes travel of any undesired conductive ions created at said sole electrode to said slow wave structure; means for establishing a magnetic field perpendicular to said electric field to establish cross electric and magnetic fields within said interaction region; means for directing electrons from said source into said interaction region; input means for coupling electromagnetic energy to one end of said slow wave srtucture wherein said electrons interact with said electromagnetic energy on said slow wave structure and transfer energy thereto and output means connected to the oher end of said slow wave structure for removing electromagnetic energy; the improvement in which said slow wave structure comprises: a hollow rectangular shaped elongated ceramic body of electrically insulative material, said ceramic body having an elongated top side which confronts said sole electrode and elongated front and back sides oriented perpendicular to said top side; a helix of electrically conductive material surrounding and extending along said ceramic body, each complete turn of said helix being connected to said front and back sides of said ceramic body and each complete turn of said helix having a portion facing said sole electrode, which portion is spaced from at least said top side of said ceramic body whereby the formation of a bridge of conductive material between adjacent turns of the helix should said top side of said body be plated by any conductive ions is prevented; and cooling means for passing coolant through the hollow of said ceramic body.

2. A cross field amplifier of the M-type having a slow wave structure; at least a first sole electrode spaced from said slow wave structure to define therebetween a first interaction region; at least a first source of electrons; means for directing electrons from said first source into said first interaction region; means for establishing a first electric field between said first sole electrode and said slow wave structure wherein said electric field promotes the travel to the slow wave structure of any undesirable conductive ions generated at the sole electrode due to any sputtering effects; and means for establishing a magnetic field in said first interaction region perpendicular to said first electric field; the improvement wherein said slow wave structure comprises: an elongated hollow ceramic body rectangular in shape and electrically insulative, said ceramic body having an elongated first surface confronting said sole electrode and elongated right and left side surfaces perpendicular to said first surface; a helix of electrically conductive material surrounding and supported by said ceramic body, said helix having a portion of each turn thereon, which portion is most proximate said sole electrode, spaced from said first surface of said ceramic body to prevent conductive ions from bridging adjacent helix turns, said helix having two further spaced portions on each complete turn connected, respectively, to said right and left side surfaces of said ceramic body; and cooling means for passing coolant through the hollow of said ceramic body.

3. The method of making a slow wave structure of the helix type for use in a cross field amplifier comprising the stops of:

(a) metallizing a grid of spaced tooth-like areas on each of the front and back sides of an elongated rectangular shaped electrically insulative ceramic body, said grids being in alignment;

(b) covering each of the top and bottom sides of said ceramic body with a corresponding strip of conductive filler material, said conductive filler material being dissolvable in a first solvent;

(c) fitting a masking mandrel of conductive filler material around the front, top, and rear sides of said ceramic body, said masking mandrel having a plurality of paced elongated slot like openings parallel to each other which extend substantially around the front, top, and rear sides of said ceramic body and aligning said slots with said metallized areas on said front and back sides of said ceramic body so as to expose said tooth-like metallized areas and to define and expose a grid of spaced tooth-like areas atop the strip of filler material, which covers the top side of said ceramic body, in alignment with the corresponding tooth-like metallized areas on the front and back sides of said ceramic body;

(d) electroforming said entire assembly of masking mandrel, filler material, and ceramic body with a second conductive material, said second conductive material being indissolvable in said first solvent, so that said second conductive material is built up over and covers said assembly;

(e) milling said electroformed structure to a desired rectangular shape, wherein said second conductive material is removed to a predetermined thickness, until there remains an elongated rectangular structure having in appearance, alternate strips of conductive filler material and second conductive material which extend over the back, front, and top sides and having said second conductive material covering the bottom side;

(f) slotting the bottom side of said structure to a depth through said second conductive material and extending between a position corresponding to one filler strip on one front or rear side of said body to a position corresponding to the next most adjacent filler strip on the side of said structure opposed to said front or rear side for each of substantially all corresponding positions so as to form on the bottom side a plurality of parallel slots inclined to said front and back sides at an angle; and, (g) dissolving in a first solvent all of said filler material; whereby a helix is formed from said second conductive material which is attached at each complete turn thereof to the front and back sides of said elongated ceramic body and in which two spaced portions of each complete turn thereof is spaced from the top and bottom sides of said ceramic body.

4. The invention as defined in claim 3 wherein said filler material comprises aluminum and said first conductive material comprises copper.

References Cited

UNITED STATES PATENTS

| | | | |
|---|---|---|---|
| 3,373,382 | 3/1968 | Diamand | 333—31 |
| 3,374,389 | 3/1968 | Cahour et al. | 315—39.3 X |
| 3,073,991 | 1/1963 | Osepchuk | 315—39.3 |
| 3,382,399 | 5/1968 | Garoff | 315—35 |

ELI LIEBERMAN, Primary Examiner

SAXFIELD CHATMON, Jr., Assistant Examiner

U.S. Cl. X.R.

29—605: 315—39.3: 330—43: 331—82

PO-1050
(5/69)

UNITED STATES PATENT OFFICE
CERTIFICATE OF CORRECTION

Patent No. 3,504,223 Dated March 31, 1970

Inventor(s) J. E. Orr et al.

It is certified that error appears in the above-identified patent and that said Letters Patent are hereby corrected as shown below:

In Column 2, line 71, the word "width" should read -- wide --; In Column 7, line 1, the word "front" has been omitted. The phrase should read -- across the top, front, and rear sides --; In Column 7, line 48, the word "oher" should read -- other --; In Column 8, line 21, the word "stops" should read -- steps --; In Column 8, line 33, the word "paced" should read -- spaced --.

SIGNED AND
SEALED
AUG 18 1970

(SEAL)
Attest:

Edward M. Fletcher, Jr.
Attesting Officer

WILLIAM E. SCHUYLER, JR.
Commissioner of Patents